United States Patent Office 3,775,516
Patented Nov. 27, 1973

3,775,516
FLAME RETARDANT POLYMER COMPOSITIONS CONTAINING PERCHLOROFULVALENE
Raymond R. Hindersinn, Lewiston, N.Y., assignor to Hooker Chemical Corporation, Niagara Falls, N.Y.
No Drawing. Continuation-in-part of application Ser. No. 762,146, Sept. 24, 1968, now Patent No. 3,717,608, which is a continuation-in-part of abandoned application Ser. No. 597,890, Nov. 30, 1966, which in turn is a continuation-in-part of application Ser. No. 184,-671, Apr. 3, 1962, now Patent No. 3,475,502. This application Sept. 20, 1971, Ser. No. 182,177
Int. Cl. C08g 45/58, 51/58
U.S. Cl. 260—880 R                    10 Claims

ABSTRACT OF THE DISCLOSURE

Polymeric uses of perchlorofulvalene include homopolymers of the compound and polymer compositions containing the compound as an additive.

REFERENCE TO PRIOR APPLICATIONS

This is a continuation-in-part of copending application Ser. No. 762,146, filed Sept. 24, 1968, now U.S. Pat. 3,717,608 which is a continuation-in-part of application Ser. No. 597,890, filed Nov. 30, 1966, now abandoned, which was a continuation-in-part of copending application Ser. No. 184,671, filed Apr. 3, 1962, now U.S. Pat. 3,475,502, issued Oct. 28, 1969.

This invention relates to uses for the compound perchlorofulvalene having an empirical formula of $C_{10}Cl_8$ and a decomposition temperature of about 200 degrees centigrade. The compound can be prepared, as disclosed in the aforesaid copending application Ser. No. 184,671, by reacting bis-phentachlorocyclopentadienyl with a solvent at a temperature in the range of about 20 to about 60 degrees centigrade in the presence of anhydrous ferrous chloride. This invention particularly relates to the polymeric uses of perchlorofulvalene. Such uses includes the polymerization of the compound itself, the copolymerization of the compound with unsaturated monomeric compounds, the use of perchlorofulvalene as an additive in polymer compositions, and the use of perchlorofulvalene as a vulcanizing or cross-linking agent for unsaturated polymers, particularly unsaturated elastomeric polymers.

Perchlorofulvalene is also useful as an ultraviolet light absorber or stabilizer for other materials such as unsaturated polyester resins, particularly halogen-containing unsaturated polyester resins that are susceptible to ultraviolet light instability. The compound is also useful as a dyestuff and as an intermediate in the preparation of insecticides.

Homopolymers of perchlorofulvalene can be prepared by heating the compound at an elevated temperature, for example, in the range of about 100 to 300 degrees centigrade, preferably in the range of about 125 to about 275 degrees centigrade. The polymer is an amorphorus yellow solid having an ebulliscopic molecular weight in benzene in the range of about 2,000 to 10,000.

In accordance with still other aspects of this invention, it is possible to employ the homopolymers of this invention in the preparation of plastic articles, reinforced plastic articles, and laminates or other filled resin compositions, and surprisingly, such materials exhibit vastly superior fire retardance and can be rendered self-extinguishing. In general, well known processes of the prior art may be used for preparing the above mixed plastic articles, reinforced plastic articles, laminates or other filled resin compositions, and castings, by substituting the copolymer of the present invention for the conventionally used vinyl unsaturated polymer.

Polymer laminates of the invention can be press cured in the conventional manner. Typical examples of good cures include cure cycles of (a) 10 minutes at 80 degrees centigrade followed by 10 minutes at 120 degrees centigrade, and (b) 30 minutes at 90 degrees centigrade followed by 30 minutes at 120 degrees centigrade. Usually, significant changes in fabrication processes are not necessary. It is generally preferred that a thermoset polymer be present in such finished articles.

The following are examples of suitable reinforcing media that can be used with the homopolymers of the invention: glass fibers, glass mats, glass cloth, glass roving, synthetic fibers such as acrylonitrile fibers such as E. I. du Pont de Nemours & Company's Orlon brand, mineral fibers such as asbestos, natural fibers such as cotton, silk and wool, and metallic fibers such as aluminum and steel.

The following are examples of fillers that can be used in the homopolymers of the invention: inorganic materials such as calcium carbonate, clay and pigments such as zinc oxide, and organic materials such as wood flour, cotton and rayon flock, sisal fibers and dyes.

Typical normally combustible polymers in which the compound of this invention finds utility as an additive are homopolymers and copolymers of ethylenically unsaturated aliphatic, alicyclic and aromatic hydrocarbons such as polyethylene, polypropylene, polybutene, ethylene-propylene copolymers; copolymers of ethylene or propylene with other olefins, polybutadiene; polymers of butadiene, polyisoprene, both natural and synthetic polystyrene and polymers of pentene, hexene, heptene, octene, 2-methylpropene-1, 4-methylhexene-1, bicyclo-(2.2.1)-2-heptene, pentadiene, hexadiene, 2,3-dimethylbutadiene-1, 3,4-vinylcyclohexene, cycloptentadiene, methylstyrene, and the like. Other polymers useful in the invention include polyindene, indenecoumarone resins; polymers of acrylate esters and polymers of methacrylate esters, acrylate and methacrylate resins such as ethyl acrylate, n-butyl methacrylate, isobutyl methacrylate, ethyl methacrylate and methyl methacrylate; alkyl resins; cellulose derivatives such as cellulose acetate, cellulose acetate butyrate, cellulose nitrate, ethyl cellulose, hydroxyethyl cellulose, methyl cellulose and sodium carboxymethyl cellulose; epoxy resins; furan resins (furfuryl alcohol or furfural-ketone); hydrocarbon resins from petroleum; isobutylene resins (polyisobutylene); isocyanate resins (polyurethanes); melamine resins such as melamine-formaldehyde and melamine-urea-formaldehyde; oleo-resins; phenolic resins such as phenol-formaldehyde, phenolic-elastomer, phenolic-epoxy, phenolic-polyamide, and phenolic-vinyl acetals; polyamide resins such as polyamides and polyamide-epoxy; polyester resins such as polyesters (unsaturated) of dibasic acids and dihydroxy compounds, and polyester elastomer and resorcinol resins such as resorcinol-formaldehyde, resorcinol-furfural, resorcinol-phenol-formaldehyde, resorcinol-polyamide and resorcinol-urea; rubbers such as natural rubber, synthetic polyisoprene, reclaimed rubber, polybutadiene, cyclized rubber, butadiene-acrylonitrile rubber, butadiene-styrene rubber, and butyl rubber; polysulfides (Thiokol); terpene resins; urea resin;s vinyl resins such as polymers of vinyl acetal, vinyl acetate or vinyl alcohol-acetate vinyl acetate copolymer, vinyl alcohol, vinyl butyral, vinyl chloride-acetate copolymer and vinyl pyrrolidone; polyformaldehyde; nylon, polycarbonates of dihydroxy compounds such as bisphenols and phosgene, and thermoplastic polymers of bisphenols and epichlorohydrin (trade named Phenoxy polymers); bitumens and asphalts.

The improved fire retardancy of the normally combustible polymers can be improved, if desired, by incorporating metallic compounds such as compounds of arsenic, antimony or bismuth in addition to the perchlorofulvalene in the polymers. Antimony oxide is the antimony compound that is presently preferred for use in the present invention. However, many antimony compounds are suitable. Suitable antimony compounds include the sulfides of antimony, salts of the alkali metals of Group I of the Periodic Table, antimony salts of organic acids and their pentavalent derivatives and the esters of antimonous acids and their pentavalent derivatives. It is convenient to use sodium antimonite or potassium antimonite when it is desired to use an alkali metal salt of the antimony for compositions of this invention. U.S. Pat. 2,996,528 discloses suitable antimony salts of organic acids and their pentavalent derivatives. Compounds of this class include antimony butyrate, antimony valerate, antimony caproate, antimony heptylate, antimony caprylate, antimony pelargonate, antimony caprate, antimony cinnate, antimony anisate, and their pentavalent dihalide derivatives. Likewise, the esters of antimonous acids and their pentavalent derivatives disclosed in U.S. Pat. 2,993,924, such as tris (n-octyl) antimonite, tris(2-ethylhexyl) antimonite, tribenzyl antimonite, tris(beta-chloroethyl) antimonite, tris-(beta-chloropropyl) antimonite, tris(beta-chlorobutyl) antimonite, and their pentavalent dihalide derivatives. Still other suitable organic antimony compounds are the cyclic antimonites such as trimethylol propane antimonite, pentaerythritol antimonite and glycerol antimonite. The corresponding arsenic and bismuth compounds can also be employed, in particular the oxides of arsenic and bismuth.

The components comprising the compositions of the instant invention can be mixed by any one of several methods. The perchlorofulvalene and other additives can be introduced into the polymer while the latter is dissolved in a suitable solvent. This procedure is especially useful when it is desired to mix the additives during the polymer manufacturing process. When the polymer is subsequently recovered from the solvent, the additives are intimately mixed with the polymer. Usually, the additives are mixed with the polymer in the molten state at temperatures that can range from the melting point to the decomposition temperature of the polymer. Alternatively, the additives and polymer are dry-blended in the finely divided state so that an intimate mixture is obtained upon subsequent molding or extrusion.

The chlorinated compound of the instant invention is desirably incorporated into polymeric materials in the range from one to about 50 percent by weight of the polymer composition, preferably from about 10 to about 35 percent by weight, and desirably in an effective fire retardant proportion.

Metallic additives are generally employed in a proportion of about one to 30 percent by weight, preferably about 5 to 20 parts by weight. The weight ratio of perchlorofulvalene to metallic additive is preferably about 2 to 1, with the total proportion of fire retardant additive being at least about 15 weight percent of the polymer composition.

The following examples illustrate methods for the preparation and utilization of the compound of this invention, however, they are not to be construed as limiting the invention. Unless indicated otherwise, parts are by weight and temperatures in degrees centigrade. The perchlorofulvalene used in these examples was prepared in accordance with Example 1 of U.S. Pat. 3,475,502, which is incorporated herein by reference.

Example 1.—Thermal polymerization of $C_{10}Cl_8$

To a weighed 100 cubic centimeter flask equipped with a stop-cock was added 0.508 gram of perchlorofulvalene, $C_{10}Cl_8$, and the system was filled with dry nitrogen. The closed container was then heated at 150 to 250 degrees centigrade in an air circulating oven for one hour. The resulting yellow solid was dissolved in 65.5 cubic centimeters of a 45:55 benzene-hexane mixture and the solution chromatographed on a column of 30.0 grams of Florisil (Floridin Co., Warren, Pa.) using 200 cubic centimeters of 55:45 hexane-benzene mixture, 160 cubic centimeters of 25:75 hexane-benzene mixture, 150 cubic centimeters of benzene, 200 cubic centimeters of 50:50 benzene-ether mixture, and 100 cubic centimeters of ether as a diluent. The initial 100 cubic centimeters of 55:45 hexane-benzene diluent was combined and evaporated to dryness to yield 0.30 gram of a yellow amorphous solid with an ebulliscopic molecular weight in benzene of 4700. The homopolymer was useful in preparing reinforced plastic articles.

Example 2.—Fire retardant polymer compositions

The fire retardant nature of perchlorofulvane was determined by compounding 30 parts of the compound with 70 parts by weight of polypropylene and testing said mixture by the ASTM D635 method modified by hand-molding in a glass tube. The sample had a self-extinguishing time of 67 seconds. A sample of unmodified polypropylene is not self-extinguishing by this test.

Example 3

Polymer compositions were prepared by dry blending polypropylene with perchlorofulvalene and antimony oxide and extruding the resulting mixture. Various proportions of the fire retardant additives were employed and specimens of the compositions were tested for fire retardance in accordance with ASTM test D635–56T, modified by employing a one-eighth inch diameter sample and by holding the flame in a vertical position and tangential to the end of the test specimen. The following results were obtained.

| Parts by weight | | | Fire retardance (seconds) |
| --- | --- | --- | --- |
| Polypropylene | Perchlorofulvalene | Antimony oxide | |
| 70 | 20 | 10 | 1.5 |
| 77.5 | 15 | 7.5 | 2 |

Examples 4 and 5

Two polymer compositions were prepared by dry blending and molding 14 parts by weight of perchlorofulvalene with 7 parts by weight of antimony trioxide with 79 parts by weight of polymethylmethacrylate and with 79 parts by weight of a graft copolymer of polybutadiene, styrene and acrylonitrile (known by the trade name Blendex 101), respectively. The molded specimens of the two polymer compositions were tested for fire retardance in accordance with the modified ASTM test D635–56T described in Example 3. The results of the fire retardant tests are shown in the following table.

| Example number | 4 | 5 |
| --- | --- | --- |
| Polymer | Polymethylmethacrylate | Copolymer of polybutadiene, styrene and acrylonitrile |
| Flame-out time (sec.) | 6.1 | 3.0 |
| After-glow time (sec.) | >53 | 10 |
| Drip | No | No |

The polymethacrylate and the copolymer of polybutadiene, styrene and acrylonitrile are found to burn when tested by the modified ASTM procedure when these polymers do not contain the additives of the invention.

Example 6

A polyester resin comprised of 0.33 mole of isophthalic acid, 0.17 mole of maleic and fumaric acids and 0.5 mole of propylene glycol was dissolved in styrene in the ratio of 66 parts by weight of styrene per 100 parts of resin at 25 degrees centigrade. The resin-styrene solution was divided into three portions, one of which was employed as a control with no additives. The other two portions of solution were blended with perchlorofulvalene and antimony trioxide in the proportions shown in the following table. All three resin-styrene solutions were cured with 0.62 part of 1,1,3,3 - tetramethylbutylperoxy - 2-ethylhexanoate as catalyst at 50 to 70 degrees centigrade over a 48 hour period. The resulting cured compositions were cut into test specimens measuring 5 x ½ x ⅛ inch and tested for fire retardancy in accordance with ASTM test D757. The test results are shown in the following table.

| Composition, parts by weight: | | | |
|---|---|---|---|
| Resin-styrene | 55 | 55 | 55 |
| Perchlorofulvalene | 0 | 3.85 | 7.6 |
| Antimony oxide | 0 | 1.9 | 3.8 |
| Fire retardance, inch/minute | 0.75 | 0.45 | 0.18 |

Various changes and modifications can be made in the compositions and methods of the invention, certain of which preferred forms have been described herein, without departing from the spirit and scope of the invention.

I claim:

1. A fire retardant polymer composition which comprises a normally combustible polymer and an effective fire retardant proportion of perchlorofulvalene, wherein said perchlorofulvalene is a chlorocarbon of the empirical formula $C_{10}Cl_8$ characterized by the property of being a crystalline material with a violet reflectance and having an ultraviolet absorption maximum at 389 millimicrons and 603 millimicrons in hexane.

2. A fire retardant polymer composition of claim 1 which comprises a normally combustible polymer, an effective fire retardant proportion of perchlorofulvalene and an antimony compound.

3. The composition of claim 2 wherein the antimony compound is antimony oxide.

4. The composition of claim 2 wherein the polymer is a polyolefin.

5. The composition of claim 4 wherein the polyolefin is polypropylene.

6. The composition of claim 2 wherein the polymer is a copolymer of polybutadiene, styrene and acrylonitrile.

7. The composition of claim 2 wherein the polymer is a polyester.

8. The composition of claim 7 wherein the polyester is polymethylmethacrylate.

9. The composition of claim 7 wherein the polyester is a polyester of a dibasic acid and a dihydroxy alcohol.

10. The composition of claim 9 wherein the polyester is a polyester of isophthalic acid, maleic acid, fumaric acid and propylene glycol.

References Cited

UNITED STATES PATENTS

| 3,136,734 | 6/1964 | Wei et al. | 260—41 |
| 3,328,472 | 6/1967 | Mark | 260—648 |
| 3,347,685 | 10/1967 | Blair et al. | 106—15 |

OTHER REFERENCES

Tetrahedron Letters, No. 10, 1961, pp. 333 to 336, article by Mark.

DONALD E. CZAJA, Primary Examiner

V. P. HOKE, Assistant Examiner

U.S. Cl. X.R.

106—15 FD; 260—2.5 AJ, 2.5 FD, 41 B, 41.5 R, 45.7 R, 45.75 R, 91.5